United States Patent
Kore et al.

(10) Patent No.: US 10,749,780 B2
(45) Date of Patent: Aug. 18, 2020

(54) SYSTEMS AND METHODS FOR MANAGEMENT OF CLOUD EXCHANGES

(71) Applicant: Ciena Corporation, Hanover, MD (US)

(72) Inventors: Mallikarjunappa Kore, Alpharetta, GA (US); Aung Htay, Alpharetta, GA (US); Yuemin Li, Roswell, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/132,622

(22) Filed: Sep. 17, 2018

(65) Prior Publication Data
US 2019/0020561 A1   Jan. 17, 2019

Related U.S. Application Data

(63) Continuation of application No. 15/342,870, filed on Nov. 3, 2016, now Pat. No. 10,110,500.

(51) Int. Cl.
*H04L 12/26* (2006.01)
*H04L 12/24* (2006.01)
(Continued)

(52) U.S. Cl.
CPC ...... *H04L 43/0864* (2013.01); *H04L 41/5009* (2013.01); *H04L 47/28* (2013.01); *H04L 67/141* (2013.01); *H04L 41/5096* (2013.01); *H04L 45/04* (2013.01); *H04L 45/44* (2013.01); *H04L 45/64* (2013.01); *H04L 67/10* (2013.01)

(58) Field of Classification Search
CPC ... H04L 43/0864; H04L 67/141; H04L 47/28; H04L 41/5009; H04L 41/5096; H04L 45/04; H04L 45/64; H04L 45/44; H04L 67/10
See application file for complete search history.

(56) References Cited

U.S. PATENT DOCUMENTS 9,875,086 B1 *   1/2018   Anderson   ............... G06F 11/34
10,178,067 B1 *   1/2019   Kumar   ................... H04L 67/02
(Continued)

OTHER PUBLICATIONS

Central Office Re-architected as Data Center from Open Networking Summit Jun. 2015-SDN showcase slides (Year: 2015).*
(Continued)

*Primary Examiner* — Christopher P Grey
(74) *Attorney, Agent, or Firm* — Clements Bernard Walker; Lawrence A. Baratta, Jr.; Christopher L. Bernard

(57) ABSTRACT

A cloud exchange includes a first connection to an enterprise; a first plurality of peering points each to an associated cloud provider of a plurality of cloud providers; a second connection to a Central office Re-architected as a Data Center (CORD) including a set of hardware and/or software from one or more existing data centers that is capable of routing traffic directly between the plurality of cloud providers, wherein the CORD comprises a second plurality of peering points to the plurality of cloud providers; and a cloud exchange management application executed on a computing system configured to cause movement of traffic data between the first plurality of peering points and the second plurality of peering points responsive to one or more of the traffic data trending between two applications in different cloud providers and latency between the two applications in different cloud providers.

20 Claims, 5 Drawing Sheets

(51) Int. Cl.
    *H04L 29/08*     (2006.01)
    *H04L 12/721*     (2013.01)
    *H04L 12/715*     (2013.01)
    *H04L 12/841*     (2013.01)

(56) References Cited

U.S. PATENT DOCUMENTS

| | | | |
|---|---|---|---|
| 10,355,989 B1* | 7/2019 | Panchal | H04L 45/64 |
| 2013/0332588 A1* | 12/2013 | Maytal | G06F 11/3428 |
| | | | 709/223 |
| 2014/0068106 A1* | 3/2014 | Turlington | H04L 41/0659 |
| | | | 709/241 |
| 2016/0127454 A1* | 5/2016 | Maheshwari | H04L 47/70 |
| | | | 709/223 |
| 2016/0337175 A1* | 11/2016 | Rao | H04L 41/0803 |
| 2017/0012870 A1* | 1/2017 | Blair | H04L 12/4633 |
| 2017/0111220 A1* | 4/2017 | Kumar | H04L 47/70 |
| 2017/0214550 A1* | 7/2017 | Kumar | H04L 41/0654 |
| 2018/0034664 A1* | 2/2018 | Mulligan | H04L 12/4641 |
| 2018/0091323 A1* | 3/2018 | Haag | H04L 12/2863 |
| 2018/0095997 A1 | 4/2018 | Beveridge et al. | |
| 2018/0376338 A1* | 12/2018 | Ashrafi | H04L 67/10 |
| 2020/0053023 A1* | 2/2020 | Haag | H04L 12/66 |
| 2020/0099546 A1* | 3/2020 | Haag | H04L 12/2856 |

OTHER PUBLICATIONS

Peterson et al. Central Office Re-Architected as a Data Center IEEE Communications Magazine Oct. 2016 (Year: 2016).*

* cited by examiner

SYSTEMS AND METHODS FOR MANAGEMENT OF CLOUD EXCHANGES

CROSS-REFERENCE TO RELATED APPLICATION(S)

The present patent/application is a continuation of U.S. patent application Ser. No. 15/342,870, filed Nov. 3, 2016, and entitled "Systems and methods for management of cloud exchanges," the contents of which are incorporated by reference herein.

BACKGROUND OF THE DISCLOSURE

Enterprises are now using a cloud exchange model to gain private access to applications offered by a cloud provider. Enterprises purchase a port into the cloud exchange and dynamically provision virtual cross-connects into any cloud provider connected to that exchange. For each virtual connection from the customer port to the cloud provider, a private set of configuration parameters is required. These configuration parameters constitute a "peering" agreement between the customer port and cloud provider. If a customer desires to connect to multiple cloud providers, multiple sets of "peering" agreements are required.

A peering agreement sets forth the details of how traffic is to be exchanged between the peering points on the cloud exchange port and the cloud provider, along with a list of expected activities which may be necessary to maintain the peering relationship, and details on how the relationship may be terminated. Typically, peering is often enabled using the Border Gateway Protocol (BGP). The BGP makes routing decisions based on paths, network policies, or rule-sets configured by a network administrator and is involved in making core routing decisions.

SUMMARY OF THE DISCLOSURE

In general, in one aspect, the present disclosure relates to a method, comprising receiving application monitoring data for a first application executing in a first cloud provider and a second application executing in a second cloud provider, wherein both the first and second cloud providers communication via a cloud exchange, performing traffic latency analytics using the received application monitoring data, determining, based on the traffic latency analytics, that at least one peering agreement between the first cloud provider and the cloud exchange should be moved to a Central office Re-architected as a Data Center (CORD), requesting a Path Computation Engine (PCE) to find the CORD that meets a required set of criteria, establishing a private link between the CORD and the cloud exchange, moving the at least one peering agreement to be between the first cloud provider and the CORD, and forwarding at least a portion of the traffic originating from the first application in the first cloud provider directly via the CORD.

In general, in one aspect, the present disclosure relates to a system, comprising a cloud exchange configured to provide an enterprise with a private connection to a first cloud provider and a second cloud provider, wherein a first peering agreement is established between the cloud exchange and the first cloud provider and a second peering agreement is established between the cloud exchange and the second cloud provider, a first application executing in the first cloud provider, a second application executing in the second cloud provider, a Path Computation Engine (PCE) configured to find a Central office Re-architected as a Data Center (CORD), and a cloud exchange management application operatively connected to the PCE and being configured to receive application monitoring data for the first and second applications, perform traffic latency analytics using the received application monitoring data, determine, based on the traffic latency analytics, that at least the first peering agreement should be moved to the CORD, request the PCE to find the CORD that meets a required set of criteria, move at least the first peering agreement to be between the first cloud provider and the CORD, and forward at least a portion of the traffic originating from the first application in the first cloud provider directly via the CORD.

Other aspects of the present disclosure will be apparent from the following description and the appended claims.

DETAILED DESCRIPTION OF THE DISCLOSURE

Figure 1:
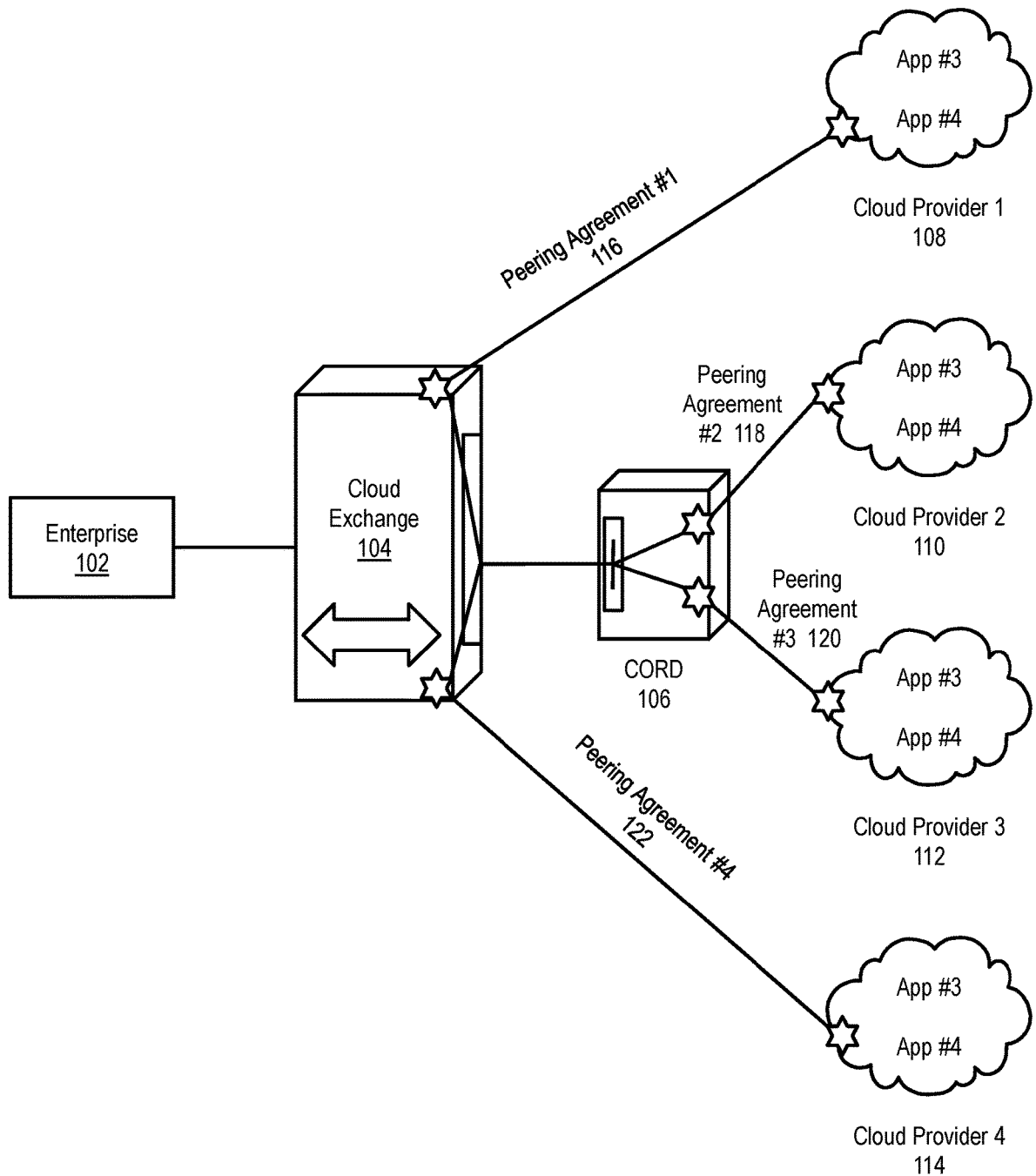
FIG. 1 shows a cloud exchange system in accordance with one or more embodiments of the present disclosure.

Specific embodiments of the present disclosure will now be described in detail with reference to the accompanying figures. Like elements in the various figures are denoted by like reference numerals for consistency.

In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the present disclosure are directed to establishing a Central office Re-architected as a Data Center (CORD) to regulate network traffic between a cloud exchange and a cloud provider on behalf of an enterprise. Specifically, embodiments of the present disclosure use a cloud exchange management application to store and analyze network latency between applications communicating via the cloud exchange to identify established peering agreements that are viable candidates to move from the cloud exchange to a CORD set-up. In one or more embodiments, such a move of one or more peering agreements is done transparently from the perspective of the cloud provider, as the peering agreements already in place are not modified in order to move them to the CORD set-up. Thus, embodiments of the present disclosure allow for the analytic-driven, dynamic placement of peering agreements in both physical and virtual networking functions in a manner such that existing agreements between the customer port and cloud providers are maintained without the need for entirely new sets of agreements between the cloud providers.

FIG. 1 shows a cloud exchange system with an established CORD (106) in accordance with one or more embodiments of the present disclosure. In one or more embodiments, an enterprise (102) may connect to one or more cloud providers (108, 110, 112, 114) via a cloud exchange (104) model, thereby allowing the enterprise to bypass the public Internet.

In one or more embodiments, a pair of peering points is established between the cloud exchange port and the cloud provider. In the scenario depicted in FIG. 1, there are four (4) pairs of peering points established initially, one between the cloud exchange (104) and each of the cloud providers (108, 110, 112, 114). In the example implementation, the Border Gateway Protocol (BGP) is used to establish the exchange routing and reachability information between the peering points. Each peering pair stores its own configuration, needed to set up a BGP session, including a BGP hash key, the peer Autonomous System (AS) number, its own AS number (e.g., a private AS number from 64512 to 66534) and the link-local (169.254.0.0/16 or fe80::/10) peer IP address and its own IP address.

Initially, all traffic is routed through the cloud exchange (104). For example, in FIG. 1, if an Application #5 in Cloud provider #2 (110) wishes to talk to Application #7 in Cloud provider #3 (112), the traffic is always routed through the Cloud Exchange (104) first, then gets routed to Cloud provider #3 (112). For example, the cloud exchange may be an Equinix Cloud Exchange. Cloud providers may be any applications such as Amazon Web Services, Google cloud platform, Microsoft Azure, etc. By leveraging such a cloud exchange, for example, the enterprise (102) is able to have a direct private network connection to the application on the public cloud instead of using a wide-area-network (WAN) connection. The enterprise (102) may use APIs (not shown) provided by the cloud exchange (104) to build a single interface for direct connection to a cloud exchange port in the cloud exchange (104). The cloud exchange port is one single physical port with bandwidth options that the enterprise (102) can choose on demand.

Peering points are set up between the cloud exchange (104) and each cloud provider (108, 110, 112, 114). For each set of peering points, a peering agreement is required (116, 118, 120, and 122). Those skilled in the art will appreciate that initially, before creation and implementation of the CORD in accordance with embodiments of the present disclosure, peering agreements 118 and 120 would be between the cloud exchange (104) and cloud provider 2 (110) and cloud provider 3 (112), respectively. For example, establishing a peering agreement #1 (116) between the cloud exchange (104) and cloud provider 1 (108) involve the following steps/information: (1) at the cloud exchange (104), create virtual interfaces and policy statements and attach VLAN 321 to support the enterprise (102) traffic to the cloud exchange router, for example; (2) set up a BGP session using the cloud exchange router IP, the cloud provider router IP, the respective ASNs, and the BGP hash key; and (3) create a virtual routing and forwarding (VRF) to be used over the BGP session. After the above steps are taken, the initial peering agreement between the cloud exchange and the cloud provider is set up. Those skilled in the art will appreciate that the above process may be repeated for each cloud provider connected to the cloud exchange. Further, in one or more embodiments, each of the aforementioned pieces of data (e.g., the ASNs, the BGP hash key, the VRF information, etc.) is stored in a cloud exchange management application discussed further in FIG. 2 below.

In one or more embodiments of the present disclosure, when traffic is trending between two applications in different cloud providers, and/or when latency between two applications in different cloud providers is no longer tolerable, the underlying Path Computation Engine (PCE) (e.g., the software-defined network (SDN) controller, virtual infrastructure manager, data sources, etc.) are utilized to select a location for a Central office Re-architected as a Data Center (CORD) (106) set up. That is, embodiments of the present disclosure collect traffic data and perform analytics on the traffic data routed through the cloud exchange in order to determine when one or more peering points needs to be shifted from the cloud exchange (104) to a CORD (106) for better performance between two applications in different cloud providers.

In one or more embodiments of the present disclosure, a CORD (106) is a set of hardware and/or software from one or more existing data centers that is capable of routing traffic directly between cloud providers (108, 110, 112, 114), without having to route the traffic via the cloud exchange (104). Thus, a CORD (106) may be a set of hardware and/or software resources redistributed from one or more existing data centers (or may be resources from a single data center) that provides a mechanism for one or more cloud providers (108, 110, 112, 114) to bypass the cloud exchange (104) for a cloud exchange model set up. For example, a CORD (106) may include one or more routers, one or more switches, servers, I/O devices, and storage. A more specific example of a CORD architecture may be a physical L3 router and an L2 switch, combined with software that acts as a CORD controller for monitoring and routing traffic. Alternatively, in another embodiment, network function virtualization (NFV) equivalents of such hardware/software components may also make up the CORD (106).

As can be seen in FIG. 1, a CORD (106) is set up for direct communication between cloud provider 2 (110) and cloud provider 3 (112), based on the analytic information collected for application #5 in cloud provider 2 (110) and application #7 in cloud provider 3 (112).

When a CORD (106) is created as described above, the peering agreements between the peering points that originally were set up between the cloud exchange (104) and the cloud providers (110, 112) are moved to be between the CORD (106) and the cloud providers (110, 112). Thus, peering agreement #2 (118) and peering agreement #3 (120) are moved so that they exist between the CORD (106) and respective cloud providers 2 and 3 (110, 112). Further, in one or more embodiments, the CORD (106) is connected to the cloud exchange (104) via a static route or inter-virtual routing and forwarding (VRF). In addition, physical layer connections may be set up if required. In one or more embodiments, the link between the newly established CORD (106) and the cloud exchange is a private link that may be set up with appropriate wavelengths, L1 cross-connects, or sub-network connections, for example.

Figure 2:
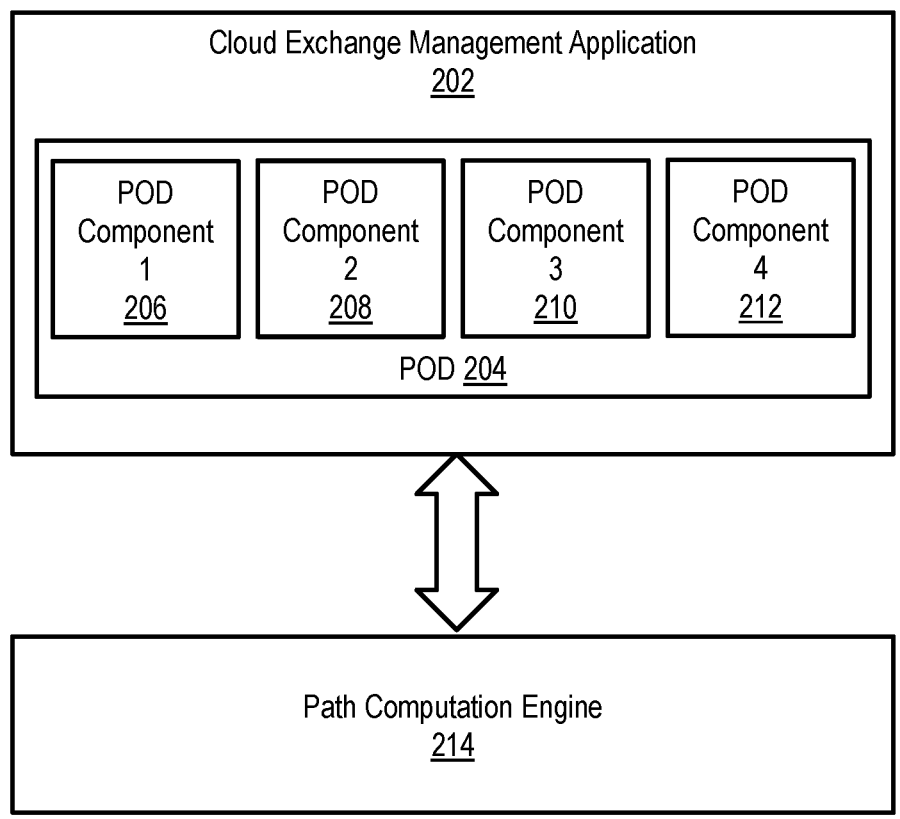
FIG. 2 shows a relational diagram in accordance with one or more embodiments of the present disclosure.

In one or more embodiments, the peering agreements (118, 120) between the cloud providers that communicate via the CORD (106) are moved in a manner that is seamless to the cloud provider. That is, because none of the underlying information changes in the peering agreements (118, 120), the cloud provider is not affected, and acts as if the peering agreement is between the same two peering points. FIG. 2 describes the process by which the peering agreement is permitted to stay the same when moved from the cloud exchange to the CORD.

While FIG. 1 shows a configuration of components, other configurations may be used without departing from the scope of the present disclosure. For example, various components may be combined to create a single component. As another example, the functionality performed by a single component may be performed by two or more components.

FIG. 2 shows a cloud exchange management application (202) and underlying PCE (214) in accordance with one or more embodiments of the present disclosure. As described above, the PCE (214) may be made up of SDN controllers, virtual infrastructure manager, data sources, etc. A bi-directional link between the cloud exchange management application (202) and the PCE (214) exists for the purpose of exchanging information. In one or more embodiments, the cloud exchange management application (202) receives application data and network monitoring/performance data from the PCE (214). The cloud exchange management application (202) is responsible for storing and managing such information for each application running across multiple cloud providers. In addition, in one or more embodiments, the cloud exchange management application (202) also stores peering agreement information based on a BGP or another suitable underlying protocol. The peering agreement information is used to move the peering agreements from the cloud exchange to a CORD established in accordance with the present disclosure when the latency between two applications in different cloud providers becomes an issue.

In one or more embodiments of the present disclosure, the cloud management application resides on a separate server not shown in FIG. 1. This server may be a physical server or a virtual machine running in the data center of the cloud exchange (104). Those skilled in the art will appreciate that in terms of the FIG. 1, there may be additional management systems assume to be there and not shown. For example, an SDN controller may manage networking between cloud exchange and cloud providers as well as between cloud exchange and enterprises. There may also be a management system for the CORD components. In one or more embodiments of the present disclosure, the cloud management application may use the APIs provided by these systems to manage the moving of peering agreements.

In one or more embodiments, the PCE may be implemented by the cloud management application itself. Alternatively, the implementation of the PCE may be delegated to the SDN controller. Further, the analytic data (e.g., network monitoring/performance data) is sent directly to the cloud management application from the data sources, rather than by the PCE.

To this end, the cloud exchange management application (202) creates PODs, which are a combination of hardware and software elements organized into a rackable element suitable for deployment in the CORD. A POD (204) is created for each CORD that is connected to a cloud exchange. At the POD level, information regarding the cloud exchange is stored. In one or more embodiments of the present disclosure, as shown in FIG. 2, each POD (204) is composed of POD components (PCs) (PC 1 (206, PC 2 (208), PC 3 (210), PC 4 (212)). There may exist one PC for each cloud provider that is connected to the cloud exchange.

Thus, looking again to the system of FIG. 1, the POD for the cloud exchange would include four (4) PCs, one for each of cloud provider 1, cloud provider 2, cloud provider 3, and cloud provider 4, as shown in FIG. 2.

For purposes of illustration, suppose further that the CORD is composed of an L3 router and an L2 switch. In this case, at the POD level, the following information may be stored in one or more data structure that are maintained by the cloud exchange management application (202): L3 router resource allocation at the cloud exchange; L2 switch resource allocation at the cloud exchange; a pointer to IP address pool (link-local); a pointer to VLAN pool; and a pointer to private autonomous system numbers (AS pool). Further, in one or more embodiments, each POD stores information for each PC. For example, for PC 1 (for peering agreement #1; 116 in FIG. 1), the POD may store the following information: Cloud exchange router IP address; Cloud exchange's AS65501 (private ASN); Cloud exchange's VLAN (used between the router and the switch of the CORD); cloud provider's router IP address, cloud provider's ASN; BGP hash key, and the cloud provider name (e.g., Amazon Web Services, etc.).

Those skilled in the art will appreciate that similar information may be stored for each PC associated with a POD. Further, information for each PC may exist in separate data structures or in a single data structure in the POD. The data structure may be a table, an array, a linked list, or any other suitable type of data structure for storing peering information. Further, while the above information assumes that the BGP sessions are used to enable dynamic route updates between the cloud exchange and the cloud providers, those of ordinary skill in the art will appreciate that the present disclosure may be applicable to other protocols used to set up and enable routing between the cloud exchange and various cloud providers.

Below is an example of the data structure and the information that may be stored for each POD, before and after the peering agreements are moved from the cloud exchange to the CORD. Those skilled in the art will appreciate that this example is not meant to limit the present disclosure in any manner, but rather, is used to illustrate one example of implementing cloud exchange management application (202) in accordance with embodiments of the present disclosure. While the below example uses JSON syntax, those of ordinary skill in the art will appreciate that any suitable syntax may be used to represent the peering information stored in the cloud exchange management application.

POD_C #1:

```
{
    "label": "POD_C#1",
    "productId": "5769906a-cf73-4fee-bd5d-7eb7d3b7cd2f",
    "tenantId": "1337c6ff-5b69-4c29-bb82-c80a90db0c36",
    "properties": {
        "vlanIdAllocations": [
            "2820"
        ],
        "podComponents": [
            {
                "cloudServiceName": "AWSDirectConnect",
                "bgpLocalIPAddress": "169.254.1.2",
                "bgpPeerIPAddress": "169.254.1.1",
                "bgpKey": "uD2C09yj9MpYU.u5yXDbQ6AU",
                "localAS": "65500",
                "peerAS": "7224"
            },
            {
                "cloudServiceName": "Google Cloud",
                "bgpLocalIPAddress": "169.254.2.2",
```

-continued

```
            "bgpPeerIPAddress": "169.254.2.1",
            "bgpKey": "gD2C09yj9MpYU.u5yXDbQ6AU",
            "localAS": "65500",
            "peerAS": "65001"
        }
    ],
    "podStatus": "INTIAL_ESTABLISHED",
    "podProfile": "C1PODProfile",
    "ipAdressesAllocations": [
        "169.254.1.1",
        "169.254.1.2",
        "169.254.2.1",
        "169.254.2.2"
    ],
    "location": "Cloud 1-Local-Customer DC"
},
"providerResourceId": "",
"discovered": false,
"orchState": "active",
"reason": "",
"id": "576c4b2f-594e-46b9-9de3-ad23449b3dc8",
"resourceTypeId": "pod.resourceTypes.POD",
"shared": false,
"differences": [ ],
"desiredOrchState": "active",
"tags": { },
"providerData": { },
"updatedAt": "2016-06-23T20:49:38.661Z",
"createdAt": "2016-06-23T20:48:47.277Z",
"autoClean": false
}
```

POD_CORD #1 (after Relocation):

```
{
    "label": "POD_CORD#1",
    "productId": "5769906a-cf73-4fee-bd5d-7eb7d3b7cd2f",
    "tenantId": "1337c6ff-5b69-4c29-bb82-c80a90db0c36",
    "properties": {
        "podComponents": [
            {
                "cloudServiceName": "AWSDirectConnect",
                "bgpLocalIPAddress": "169.254.1.2",
                "bgpPeerIPAddress": "169.254.1.1",
                "bgpKey": "uD2C09yj9MpYU.u5yXDbQ6AU",
                "localAS": "65500",
                "peerAS": "7224"
            },
            {
                "cloudServiceName": "Google",
                "bgpLocalIPAddress": "169.254.2.2",
                "bgpPeerIPAddress": "169.254.2.1",
                "bgpKey": "gD2C09yj9MpYU.u5yXDbQ6AU",
                "localAS": "65500",
                "peerAS": "65001"
            },
            {
                "cloudServiceName": "CORDToCloud1ForAWS",
                "bgpLocalIPAddress": "169.254.1.3",
                "bgpPeerIPAddress": "169.254.1.4",
                "bgpKey": "uD2C09yj9MpYU.u5yXDbQ6AU",
                "localAS": "65520",
                "peerAS": "65521"
            },
            {
                "cloudServiceName": "CORDToCloud1ForGoogle",
                "bgpLocalIPAddress": "169.254.2.3",
                "bgpPeerIPAddress": "169.254.2.4",
                "bgpKey": "gD2C09yj9MpYU.u5yXDbQ6AU",
                "localAS": "65522",
                "peerAS": "65523"
            }
        ],
        "podStatus": "RELOCATED_TO_CORD#1",
        "podProfile": "C1PODProfile",
        "ipAdressesAllocations": [
            "169.254.1.1",
            "169.254.1.2",
            "169.254.1.3",
            "169.254.1.4",
            "169.254.2.1",
            "169.254.2.2",
            "169.254.2.3",
            "169.254.2.4"
        ],
        "location": "CORD#1"
    },
    "providerResourceId": "",
    "discovered": false,
    "orchState": "active",
    "reason": "",
    "id": "576c4e05-5211-4702-a73f-0904279922b0",
    "resourceTypeId": "pod.resourceTypes.POD",
    "shared": false,
    "differences": [ ],
    "desiredOrchState": "active",
    "tags": { },
    "providerData": { },
    "updatedAt": "2016-06-23T21:01:29.007Z",
    "createdAt": "2016-06-23T21:00:53.684Z",
    "autoClean": false
}
```

POD_C #1 (after Relocation):

```
{
    "label": "POD_C#1",
    "productId": "5769906a-cf73-4fee-bd5d-7eb7d3b7cd2f",
    "tenantId": "1337c6ff-5b69-4c29-bb82-c80a90db0c36",
    "properties": {
        "vlanIdAllocations": [
            "2820"
        ],
        "podComponents": [
            {
                "cloudServiceName": "Cloud1ToAWSViaCORD",
                "bgpLocalIPAddress": "169.254.1.4",
                "bgpPeerIPAddress": "169.254.1.3",
                "bgpKey": "uD2C09yj9MpYU.u5yXDbQ6AU",
                "localAS": "65521",
                "peerAS": "65520"
            },
            {
                "cloudServiceName": "Cloud1ToGoogleViaCORD",
                "bgpLocalIPAddress": "169.254.2.4",
                "bgpPeerIPAddress": "169.254.2.3",
                "bgpKey": "gD2C09yj9MpYU.u5yXDbQ6AU",
                "localAS": "65523",
                "peerAS": "65522"
            }
        ],
        "podStatus": "RELOCATED_TO_CORD#1",
        "podProfile": "C1PODProfile",
        "ipAdressesAllocations": [
            "169.254.1.3",
            "169.254.1.4",
            "169.254.2.3",
            "169.254.2.4"
        ],
        "location": "Cloud1-Local-Customer DC"
    },
    "providerResourceId": "",
    "discovered": false,
    "orchState": "active",
    "reason": "",
    "id": "576c4b2f-594e-46b9-9de3-ad23449b3dc8",
    "resourceTypeId": "pod.resourceTypes.POD",
    "shared": false,
    "differences": [ ],
    "desiredOrchState": "active",
    "tags": { },
    "providerData": { },
```

-continued

```
   "updatedAt": "2016-06-23T22:18:04.184Z",
   "createdAt": "2016-06-23T22:17:32.861Z",
   "autoClean": false
}
```

As can be seen above, POD_C #1 shows two Cloud Connect Services (AWS Direct Connect and Google Cloud) from the Cloud Exchange with the following peering agreements:

```
{
    "cloudServiceName": "AWSDirectConnect",
    "bgpLocalIPAddress": "169.254.1.2",
    "bgpPeerIPAddress": "169.254.1.1",
    "bgpKey": "uD2C09yj9MpYU.u5yXDbQ6AU",
    "localAS": "65500",
    "peerAS": "7224"
},
{
    "cloudServiceName": "Google Cloud",
    "bgpLocalIPAddress": "169.254.2.2",
    "bgpPeerIPAddress": "169.254.2.1",
    "bgpKey": "gD2C09yj9MpYU.u5yXDbQ6AU",
    "localAS": "65500",
    "peerAS": "65001"
}
```

As part of a relocation to CORD, the above same peering agreements for VRFs are moved to CORD, as shown by the "cloudServiceName": "CORDToCloud1ForAWS" section and the "cloudServiceName": "CORDToCloud1ForGoogle" section of the above example.

In one or more embodiments, the relocation is very transparent to the cloud service providers because the same peering agreements are met. That is, because the majority of the information from the original peering agreement between the cloud exchange and the cloud providers remains unchanged, the cloud provider (Aws, Google), are not aware that the CORD has been implemented and the peering agreements are moved over. In addition, because the POD and associated PCs store all the necessary information for each established peering agreement, when the peering agreement is moved to the CORD, all the information is already present and can be used to seamlessly move the peering agreement for direct cloud provider to cloud provider communication. Further, the link between the CORD and the cloud exchange is also created using the information stored in the cloud exchange management application (202).

Figure 3:
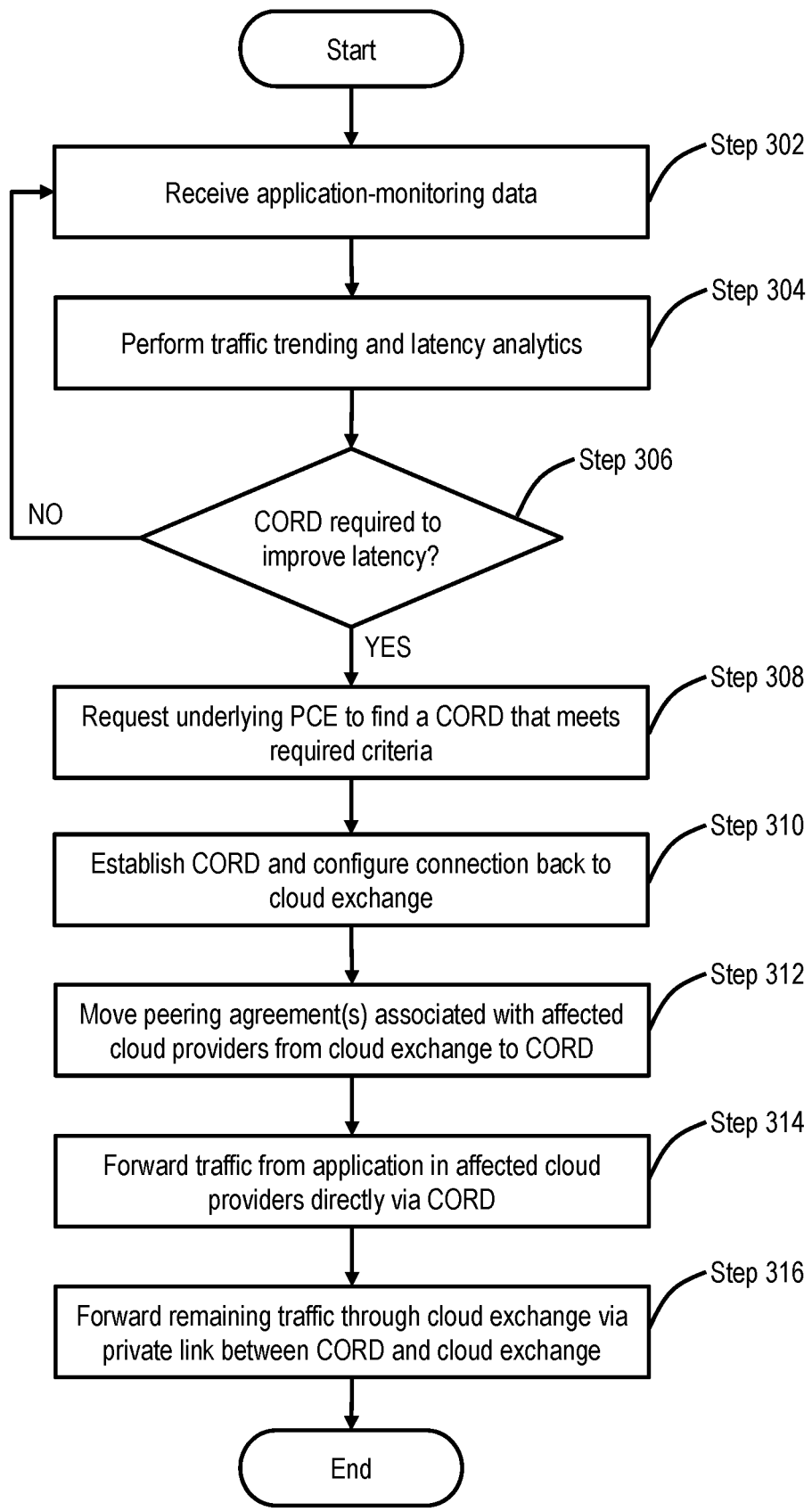
FIG. 3 shows a flowchart for setting up a CORD in accordance with one or more embodiments of the present disclosure.

FIG. 3 shows a flowchart for implementing a CORD using the cloud exchange management application in accordance with one or more embodiments of the present disclosure. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the present disclosure. By way of an example, determination steps may not require a processor to process an instruction unless an interrupt is received to signify that condition exists in accordance with one or more embodiments of the present disclosure. As another example, determination steps may be performed by performing a test, such as checking a data value to test whether the value is consistent with the tested condition in accordance with one or more embodiments of the present disclosure.

Initially, in Step 302, the cloud exchange management application receives application-monitoring data. Specifically, in one or more embodiments, the cloud exchange management may receive and store, in various data structures, the latency, trends, and other information, for traffic flowing between the cloud exchange and the one or more cloud providers. In Step 304, the cloud exchange management application performs traffic trending and latency analytics based on the application monitoring data received in Step 302. For example, the cloud exchange management application may first determine that traffic is increasing between particular applications in different cloud providers. Checking the latency, the cloud exchange management application may foreshadow or determine that the traffic latency between the particular applications is already exhibiting or will soon reach an unacceptable level.

Based on the traffic analytics, a determination is made as to whether a CORD is required to improve the traffic latency between two or more applications in different cloud providers, thereby enabling more direct communication between the cloud providers (Step 306). This may be determined based on, for example, a threshold latency that the cloud exchange management application stores, beyond which a CORD is determined to be a more optimal solution. If a CORD is not required, (i.e., the latencies and traffic patterns between the cloud exchange and the cloud providers are under control and acceptable), then the process return to Step 302 for continued monitoring.

If a CORD is determined to be required or more optimal than routing all traffic between affected cloud provider via the cloud exchange in Step 306, then a request is made to the underlying PCE components to find a CORD that meets required criteria (Step 308). More specifically, in one or more embodiments of the present disclosure, a path computation request to the underlying SDN controller may be made to find a CORD with connections to the cloud exchange, affected cloud providers in which the applications with intolerable latency reside, and that satisfies the bandwidth and desired latency requirement that is fed to the SDN controller by the cloud exchange management application. Also as a part of Step 308, in one or more embodiments, the peering agreements between the cloud exchange and the affected cloud providers are identified as candidates to be moved from the cloud exchange to the CORD. The peering agreements may be identified based on the information stored in the cloud exchange management application.

At this stage, the PCE may inform the cloud management application that a CORD has been found that meets the required criteria. In Step 310, the CORD is established and a connection from the CORD back to the cloud exchange is configured. The connection from the CORD to the cloud exchange may be a statically routed connection, or may involve inter VRF routing and/or physical layer connections. In Step 312, the identified peering agreements for the affected cloud providers are moved from the cloud exchange to the CORD. In one or more embodiments of the present disclosure, the cloud providers are not aware of the move, as the peering agreement remains largely unchanged from the cloud provider's perspective.

Once the peering agreements are moved to the CORD, traffic to and from the applications in the affected cloud providers is forwarded directly via the CORD (Step 314). Latency is improved between the affected applications, and the applications are able to communicate more directly. In one or more embodiments, information regarding the traffic, including continued trend and latency monitoring, continues by the cloud exchange management application, even when the traffic is forwarded from one application to another via the CORD. Remaining traffic to and from other applications in the affected cloud providers that were not identified as having latency issues is forwarded through the cloud exchange via the private back link established between the CORD and the cloud exchange (Step 316). That is, looking at FIG. 1 for example, if application #5 and application #7 were to two applications that were directly communication at a high frequency and exhibiting unacceptable latency, the peering agreements between the cloud exchange and cloud provider 2, and the peering agreement between the cloud exchange and cloud provider 3 would be moved to the CORD. However, after establishment of the CORD, while traffic from application #5 to application #7 (and vice versa) would be forwarded directly via the CORD, traffic between application #6, and for example, either application #7 or application #8 would continue to be routed through the cloud exchange via the private link between the CORD and the cloud exchange.

Those skilled in the art will appreciate that while the above disclosure focuses on moving two peering agreements to reduce the latency between applications in different cloud providers talking to each other, any number of peering agreements may be moved/shifted to a CORD based on the analytics performed on network traffic. For example, a single peering agreement may be moved to a CORD, when there exists latency issues with respect to a single cloud provider and the cloud exchange.

Figure 4:
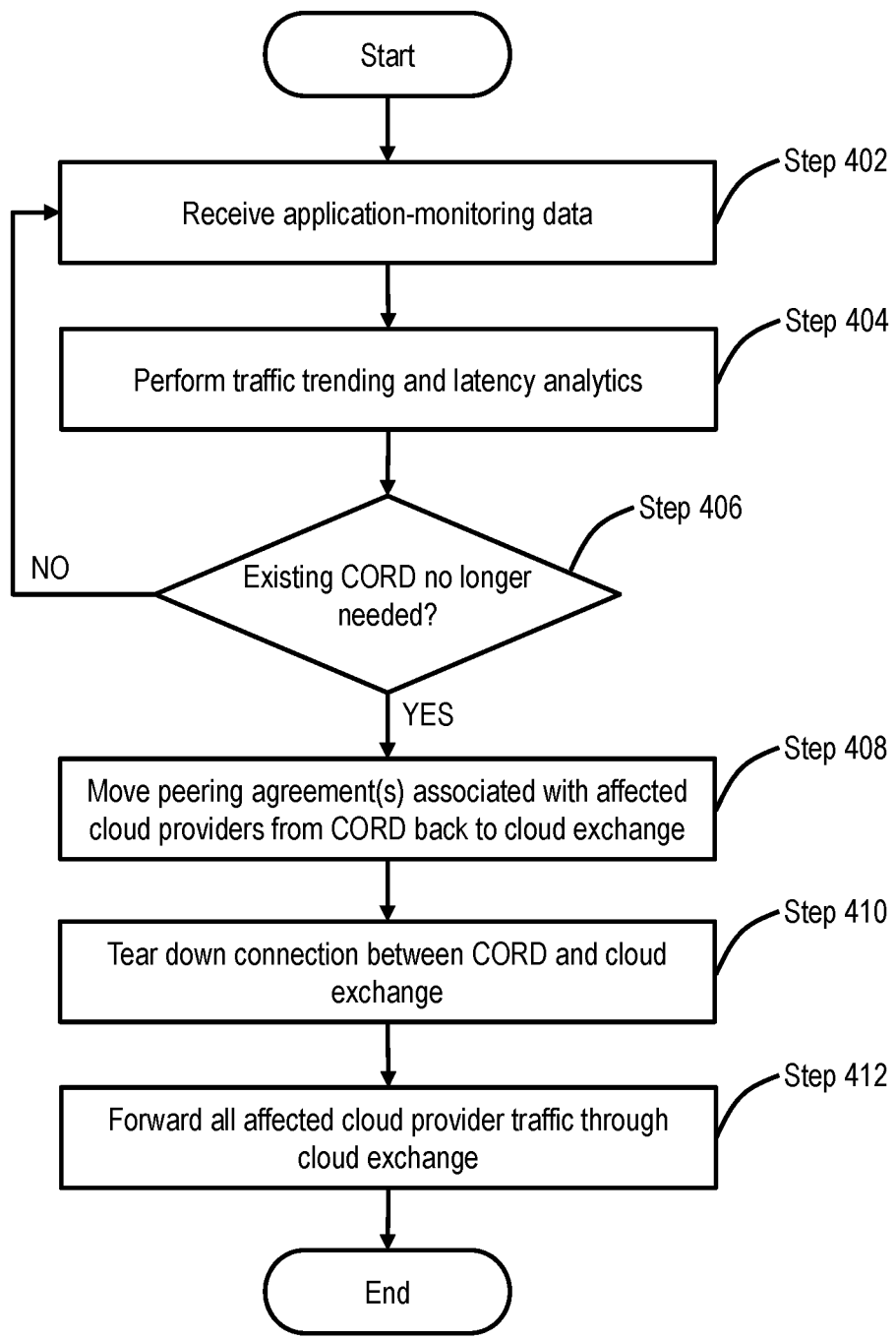
FIG. 4 shows a flowchart for tearing down a CORD in accordance with one or more embodiments of the present disclosure.

FIG. 4 shows a flowchart for tearing down an established CORD in accordance with one or more embodiments of the present disclosure. Initially, in Step 402, the cloud exchange management application continues to receive application monitoring data based on traffic being routed via the cloud exchange as well as being forwarded directly via the CORD. Traffic trending and latency analytics are performed on the received application monitoring data by the cloud exchange management application (Step 404). At this stage, a decision is made based on the analytics as to whether the existing CORD continues to be necessary to bring latency to acceptable levels (Step 406). For example, analytics may show that traffic between two applications residing in different cloud providers that are currently being forwarded via the CORD is slowing down. In such a case, the CORD set up may no longer be needed. If the CORD continues to be required, the process returns to Step 402 for continued monitoring.

When it is determined that the CORD is no longer necessary, the affected peering agreements are identified and moved back to the cloud exchange in Step 408. That is, the peering agreements are shifted from the CORD to the original cloud exchange for which they were set up. This is done seamlessly from the perspective of the cloud provider, which did not know that the peering agreements were moved to a CORD for purposes of improving latency. The data structures in the cloud exchange management application are updated to reflect that the CORD is no longer present between the affected peering agreements. Because all of the data for the original peering agreements when they are initially set up is stored in the cloud exchange management application, and because moving the peering agreements to the CORD does not substantially change the peering agreement from the perspective of the cloud provider, reverting back to the original set up requires very little to change. Next, the private back link between the CORD and the cloud exchange is then torn down (Step 410), and the traffic is routed via the cloud exchange to all of the affected cloud providers (Step 412).

Embodiments of the present disclosure generally allow for the analytic-driven, dynamic placement of peering agreements in both physical and virtual networking functions. Importantly, existing agreements between the customer port and cloud providers are maintained without the need for entirely new sets of agreements between the cloud providers. The CORD vision is to deliver economies of scale for data centers, using white box hardware, open-source software and virtualization technologies such as software-defined networking (SDN) and network functions virtualization (NFV). Further, embodiments of the present disclosure use multi-layer SDN controller constraints based PCE to simultaneously satisfy both latency and CORD placement to maximize the economy of commodity hardware (for example, white boxes and/or Virtualized Network Functions (VNFs)). Routing is transparent to the cloud service providers and orchestrated using the big data analytics. In addition, a resource model is provided to orchestrate peering agreements placement at the CORD in the network.

The following application example is for purposes of illustration only, and is not meant to limit the present disclosure. In current times, streaming video is changing the Internet. Internet Content Providers (ICPs) desire to connect their domain close to their consumers. Private lines, such as those established via the cloud exchange are one solution to this evolving use of high bandwidth, minimal latency data. Embodiments of the present disclosure provide the hardware and software necessary to improve application performance. Consider the case of an enterprise, which has deployed multiple applications (workloads) across different cloud providers. Most Data Center (DC) traffic that uses 10 GbE, 40 GbE or 100 GbE connections between them will crawl to a halt when the traffic is routed through the public Internet. The enterprise is utilizing the cloud exchange provider to connect to those cloud providers (FIG. 1) bypassing the public Internet. Furthermore, the establishment of the CORD to address latency issues before or real-time as they occur is critical to ensure that streaming video does not buffer or stall.

Figure 5:
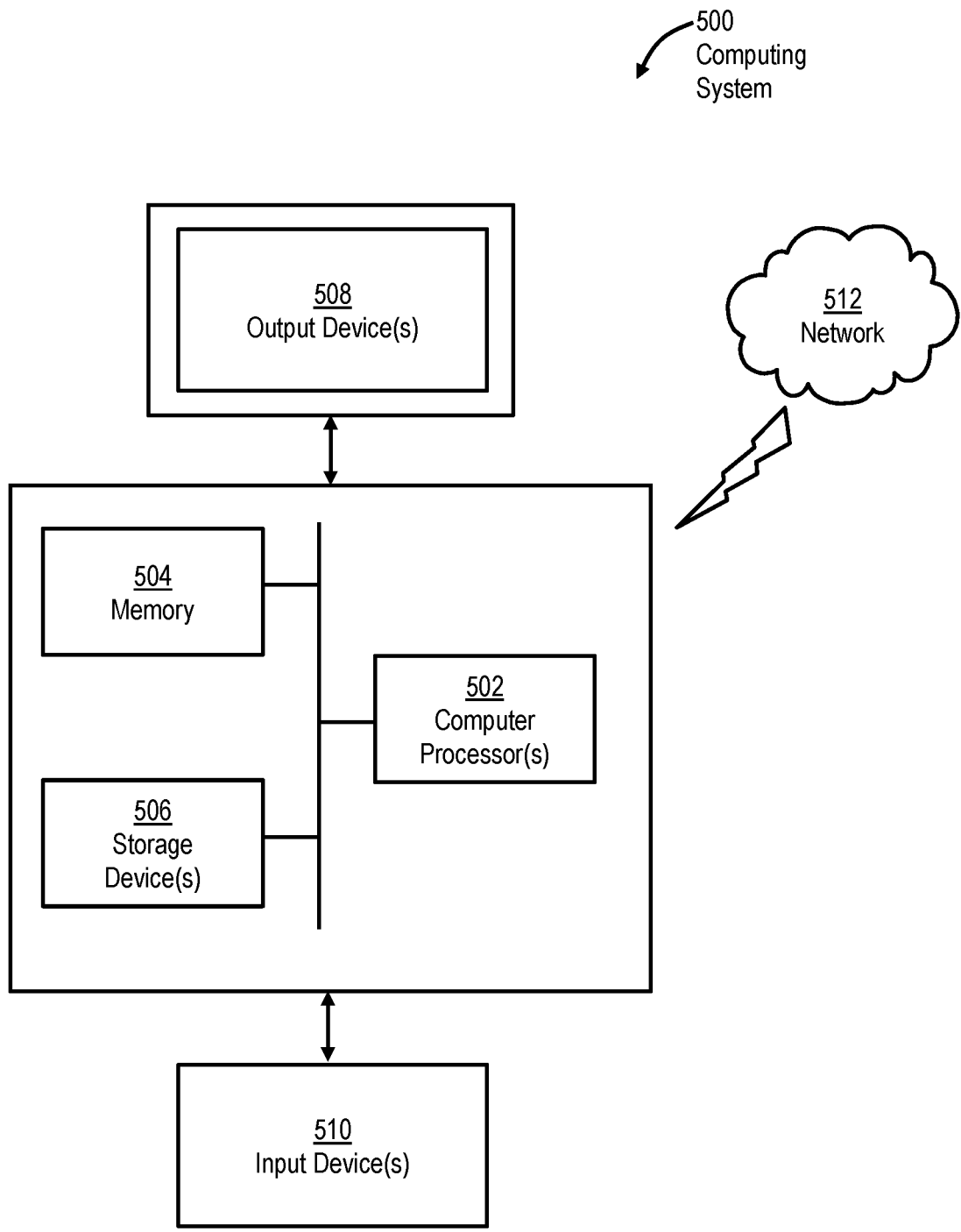
FIG. 5 shows a computer system in accordance with one or more embodiments of the present disclosure.

Embodiments of the present disclosure may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the present disclosure may be stored, in whole or in part, temporarily or permanently, on a non-transitory computer readable medium such as a CD, DVD, storage device, a diskette, a tape, flash memory, physical memory, or any other computer-readable storage medium. Specifically, the software instructions may correspond to computer readable program code that when executed by a processor(s), is configured to perform embodiments of the present disclosure.

Further, one or more elements of the aforementioned computing system (500) may be located at a remote location and connected to the other elements over a network (512). Further, embodiments of the present disclosure may be implemented on a distributed system having a plurality of nodes, where each portion of the present disclosure (the cloud exchange, the CORD, the cloud providers, etc.) may be located on a different node within the distributed system. In one embodiment of the present disclosure, the node corresponds to a distinct computing device. Alternatively, the node may correspond to a computer processor with associated physical memory. The node may alternatively correspond to a computer processor or micro-core of a computer processor with shared memory and/or resources.

While the present disclosure has been described with respect to a limited number of embodiments, those skilled in the art, having benefit of this disclosure, will appreciate that other embodiments can be devised which do not depart from the scope of the present disclosure as disclosed herein. Accordingly, the scope of the present disclosure should be limited only by the attached claims.

What is claimed is:

1. A cloud exchange comprising:
   a first connection to an enterprise;
   a first plurality of peering points each to an associated cloud provider of a plurality of cloud providers;
   a second connection to a Central office Re-architected as a Data Center (CORD) including a set of hardware and/or software from one or more existing data centers that is capable of routing traffic directly between the plurality of cloud providers and configured to regulate the traffic on behalf of the enterprise, wherein the CORD includes a second plurality of peering points to connect to the plurality of cloud providers; and
   a cloud exchange management application executed on a computing system configured to cause movement of traffic data between the first plurality of peering points and the second plurality of peering points responsive to one or more of the traffic data trending between two applications in different cloud providers and latency between the two applications in different cloud providers,
   wherein the first plurality of peering points and the second plurality of peering points are defined by information that is used for the movement of the traffic data.

2. The cloud exchange of claim 1, wherein the first connection is a direct private network connection between the enterprise and the cloud exchange, and wherein, initially, all of the traffic data between the enterprise and the two applications is routed through the cloud exchange through the first plurality of peering points.

3. The cloud exchange of claim 1, wherein the first plurality of peering points and the second plurality of peering points utilize virtual interfaces and Virtual Local Area Network (VLAN) connections in the cloud exchange along with a Border Gateway Protocol (BGP) session.

4. The cloud exchange of claim 1, wherein the cloud exchange management application is configured to monitor the traffic data to detect the traffic data trending and the latency.

5. The cloud exchange of claim 1, wherein the CORD routes the traffic data directly between the different cloud providers bypassing the cloud exchange.

6. The cloud exchange of claim 1, wherein the movement of the traffic data comprises moving associated peering points from the first plurality of peering points to the second plurality of peering points.

7. The cloud exchange of claim 1, wherein the information comprises one or more of
   a cloud exchange router Internet Protocol (IP) address, a cloud exchange private Autonomous System Number (ASN), a cloud exchange Virtual Local Area Network (VLAN), a cloud provider router IP address, a cloud provider ASN, a Border Gateway Protocol (BGP) hash key, and a cloud provider name.

8. The cloud exchange of claim 7, wherein the movement of the traffic data comprises moving associated peering points from the first plurality of peering points to the second plurality of peering points through
   changing a BGP local IP address, a BGP peer IP address, local autonomous system (AS) number and peer AS number to point to the CORD; and
   keeping the BGP hash key the same.

9. A cloud exchange method comprising:
   operating a first connection to an enterprise and a first plurality of peering points each to an associated cloud provider of a plurality of cloud providers;
   operating a second connection to a Central office Re-architected as a Data Center (CORD) including a set of hardware and/or software from one or more existing data centers that is capable of routing traffic directly between the plurality of cloud providers and configured to regulate the traffic on behalf of the enterprise, wherein the CORD includes a second plurality of peering points to connect to the plurality of cloud providers; and
   operating a cloud exchange management application executed on a computing system configured to cause movement of traffic data between the first plurality of peering points and the second plurality of peering points responsive to one or more of the traffic data trending between two applications in different cloud providers and latency between the two applications in different cloud providers,
   wherein the first plurality of peering points and the second plurality of peering points are defined by information that is used for the movement of the traffic data.

10. The cloud exchange method of claim 9, wherein the first connection is a direct private network connection between the enterprise and the cloud exchange, and wherein, initially, all of the traffic data between the enterprise and the two applications is routed through the cloud exchange through the first plurality of peering points.

11. The cloud exchange method of claim 9, wherein the first plurality of peering points and the second plurality of peering points utilize virtual interfaces and Virtual Local Area Network (VLAN) connections in the cloud exchange along with a Border Gateway Protocol (BGP) session.

12. The cloud exchange method of claim 9, wherein the cloud exchange management application is configured to monitor the traffic data to detect the traffic data trending and the latency.

13. The cloud exchange method of claim 9, wherein the CORD routes the traffic data directly between the different cloud providers bypassing the cloud exchange.

14. The cloud exchange method of claim 9, wherein the movement of the traffic data comprises moving associated peering points from the first plurality of peering points to the second plurality of peering points.

15. The cloud exchange method of claim 9, wherein the first plurality of peering points and the second plurality of peering points are defined by information comprising one or more of
- a cloud exchange router Internet Protocol (IP) address, a cloud exchange private Autonomous System Number (ASN), a cloud exchange Virtual Local Area Network (VLAN), a cloud provider router IP address, a cloud provider ASN, a Border Gateway Protocol (BGP) hash key, and a cloud provider name.

16. A cloud exchange management system comprising:
- a connection to:
  - a cloud exchange which connects to an enterprise and has a first plurality of peering points each to an associated cloud provider of a plurality of cloud providers; and
- a second plurality of peering points between the associated cloud provider of the plurality of cloud providers and a Central office Re-architected as a Data Center (CORD) including a set of hardware and/or software from one or more existing data centers that is capable of routing traffic directly between the plurality of cloud providers and configured to regulate the traffic on behalf of the enterprise, wherein the second plurality of peering points are to connect the CORD to the plurality of cloud providers;
- one or more computer processors;
- memory storing software instructions that, when executed, cause the one or more computer processors configured to
  - monitor application data between at least two applications in different cloud providers, and
- cause movement of the application data between the first plurality of peering points and the second plurality of peering points responsive to one or more of the application data trending between the at least two applications and latency between the at least two applications, wherein the first plurality of peering points and the second plurality of peering points are defined by information that is used for the movement of the traffic data.

17. The cloud exchange management system of claim 16, wherein the first connection is a direct private network connection between the enterprise and the cloud exchange, and wherein, initially, all of the traffic data between the enterprise and the two applications is routed through the cloud exchange through the first plurality of peering points.

18. The cloud exchange management system of claim 16, wherein the first plurality of peering points and the second plurality of peering points utilize virtual interfaces and Virtual Local Area Network (VLAN) connections in the cloud exchange along with a Border Gateway Protocol (BGP) session.

19. The cloud exchange management system of claim 16, wherein the cloud exchange management application is configured to monitor the traffic data to detect the traffic data trending and the latency.

20. The cloud exchange management system of claim 16, wherein the movement of the traffic data comprises moving associated peering points from the first plurality of peering points to the second plurality of peering points.

* * * * *